US012767764B2

(12) United States Patent
Yang et al.

(10) Patent No.: US 12,767,764 B2
(45) Date of Patent: Oct. 20, 2026

(54) METHOD OF PREPARING ALKYL FUNCTIONALIZED POLYSILOXANE

(71) Applicant: Wacker Chemie AG, Munich (DE)

(72) Inventors: Heng Yang, Shanghai (CN); Shuai Tian, Shanghai (CN); Xiong Zang, Shanghai (CN)

(73) Assignee: Wacker Chemie AG, Munich (DE)

( * ) Notice: Subject to any disclaimer, the term of this patent is extended or adjusted under 35 U.S.C. 154(b) by 723 days.

(21) Appl. No.: 18/023,004

(22) PCT Filed: Sep. 7, 2020

(86) PCT No.: PCT/CN2020/113750

§ 371 (c)(1),
(2) Date: Feb. 24, 2023

(87) PCT Pub. No.: WO2022/047778

PCT Pub. Date: Mar. 10, 2022

(65) Prior Publication Data

US 2023/0323036 A1 Oct. 12, 2023

(51) Int. Cl.
*C08G 77/16* (2006.01)

(52) U.S. Cl.
CPC .................................... *C08G 77/16* (2013.01)

(58) Field of Classification Search
CPC ...... C08G 77/16; C08G 77/04; C08G 77/045; C08G 77/06; C08L 83/04; C07F 7/21
See application file for complete search history.

(56) References Cited

U.S. PATENT DOCUMENTS

| | | | | |
|---|---|---|---|---|
| 6,417,310 | B1 | 7/2002 | Omura et al. | |
| 2013/0172592 | A1* | 7/2013 | Li | C08G 18/755 556/419 |
| 2016/0215097 | A1* | 7/2016 | Sivasubramanian | C08G 77/08 |

FOREIGN PATENT DOCUMENTS

| | | | |
|---|---|---|---|
| CN | 1259536 | A | 7/2000 |
| CN | 101781328 | A | 7/2010 |
| CN | 105838079 | A | 8/2016 |
| EP | 0501077 | * | 2/1992 |
| EP | 0501077 | A1 | 9/1992 |
| JP | 2005-336391 | * | 12/2005 |
| JP | 2011246363 | A | 12/2011 |
| JP | 2013139569 | A | 7/2013 |

OTHER PUBLICATIONS

Hara JP2005-336391 Machine Translation from JPO (Year: 2005).*
Siloxane Review (Year: 2020).*
Flagg Macromolecules vol. 49 p. 8581 (Year: 2016).*

* cited by examiner

*Primary Examiner* — John M Cooney
*Assistant Examiner* — Adam J Berro
(74) *Attorney, Agent, or Firm* — Brooks Kushman P.C.

(57) ABSTRACT

A method of preparing alkyl functionalized polysiloxane, comprising: I) reacting silane oligomer with hydroxyl-terminated polysiloxane in the presence of Catalyst 1, and II) reacting the product of Step (I) with an endcapper in the presence of Catalyst 2. This method could flexibly adjust the polymerization degree and viscosity of the desired long-chain alkyl functionalized polysiloxane for different application fields and introduce multiple alkyl functional groups and further functional groups to obtain bifunctionalized polysiloxane, moreover this method could greatly reduce the proportion of undesired cyclosiloxanes in the equilibrium product and the reaction is mild, easy to operate and environmentally friendly.

17 Claims, No Drawings

METHOD OF PREPARING ALKYL FUNCTIONALIZED POLYSILOXANE

CROSS-REFERENCE TO RELATED APPLICATION

This application is a U.S. National Phase Application of PCT/CN2020/113750, filed Sep. 7, 2020, the entire disclosure of which is hereby incorporated by reference.

FIELD OF THE INVENTION

The present disclosure relates to a method of preparing alkyl functionalized polysiloxane.

BACKGROUND OF THE INVENTION

Attention has been drawn to long-chain alkyl functionalized polysiloxanes due to their good lubricity, water repellency, antifouling, wear resistance, defoaming, anti-sticking, printability and compatibility with organic materials.

Nowadays long-chain alkyl functionalized polysiloxanes are prepared mainly by three ways. One way is by co-hydrolysis condensation of alkoxysilane or chlorosilane with a long-chain alkyl and hydroxysilane. Another way is by hydrosilation reaction between hydrogen-containing siloxane and a-olefin-, and a further way is by catalytic equilibrium of alkoxysilane or siloxane oligomer with a long-chain alkyl and small molecular cyclosiloxane in the presence of an endcapper.

The first way is particularly suitable for preparation of long-chain alkyl functionalized siloxane with a low degree of polymerization and the reaction between alkoxysilane or chlorosilane and hydroxysilane is very sensitive to catalyst. The molecular structure of the siloxane prepared by the second way is subject to the starting material hydrogen-containing siloxane, and it is not possible to adjust the polymerization degree and viscosity of the long-chain alkyl functionalized siloxane nor introduce further functional groups, besides hydrosilation reaction is a highly exothermic reaction which places strict requirements on process safety, moreover treatment of residual olefins is difficult. For the third way, a relatively large proportion of cyclosiloxanes will be present in the prepared siloxane even after vacuum distillation, affecting the product performance. As disclosed in CN105838079A, the long-chain alkyl functionalized vinylsiloxane prepared by catalytic equilibrium of tetramethyltetraalkylsiloxane, octamethylcyclotetrasiloxane and tetramethyldivinyldisiloxane at 110-120° C. has such defect.

SUMMARY OF THE INVENTION

In view of the defects existing in the prior arts, the preparation method of the alkyl functionalized polysiloxane provided by the present disclosure can achieve at least one of the goals as follows.

i) The polymerization degree and viscosity of the long-chain alkyl functionalized polysiloxane can be flexibly adjusted according to needs, by controlling the feeding of hydroxyl-terminated polysiloxane, silane oligomer and endcapper, for different application fields.
ii) Multiple (≥3) alkyl functional groups can be introduced, and further functional groups can be introduced conveniently to obtain bifunctionalized polysiloxane.
iii) The proportion of undesired cyclosiloxanes in the equilibrium product is greatly reduced by using linear hydroxyl-terminated polysiloxane as the starting material.
iv) The reaction is mild, easy to operate, and environmentally friendly.

The present disclosure provides a method of preparing alkyl functionalized polysiloxane, comprising:

I) reacting silane oligomer (A) with hydroxyl-terminated polysiloxane (B) in the presence of Catalyst 1, the silane oligomer (A) comprises cyclic oligomer (A1) of Formula I,

I

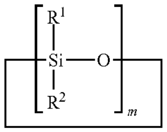

where $R^1$ is independently at each occurrence a C6-C18 alkyl, for example hexyl, octyl, decyl, dodecyl, tetradecyl, hexadecyl, preferably a C6-C16 alkyl especially a C6-C12 alkyl;
$R^2$ is independently at each occurrence a C1-C5 alkyl, for example methyl, ethyl, propyl, butyl, pentyl, preferably methyl;
m is an arbitrary number between 3 and 20, for example 3, 4, 5, 6, 8, 10, 15, 20; and II) reacting the product of Step (I) with an endcapper in the presence of Catalyst 2 to give the alkyl functionalized polysiloxane.

Silane Oligomer (A)

The silane oligomer (A) comprises more than 20 wt %, for example more than 50 wt %, preferably more than 70 wt % of cyclic oligomer (A1), based on the total weight of silane oligomer (A). In an embodiment herein, the silane oligomer (A) comprises from 20 wt % to 95 wt %, for example from 50 wt % to 95 wt %, preferably from 70 wt % to 95 wt %, based on the total weight of silane oligomer (A). Preference is given to cyclic trimer and tetramer of Formula I, which are easy to open loop in the equilibrium reaction. In an embodiment herein, the silane oligomer (A) comprises more than 30 wt % especially more than 60 wt % of cyclic trimer and tetramer of Formula I, based on the total weight of silane oligomer (A). In a more specific embodiment herein, the silane oligomer (A) comprises more than 30 wt % especially more than 40 wr/oof cyclic trimer of Formula I, based on the total weight of silane oligomer (A).

The silane oligomer (A) of the present disclosure may further comprise linear oligomer (A2) of Formula II,

II

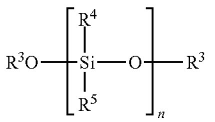

where $R^3$ is methyl, ethyl or hydrogen, especially methyl or ethyl,
$R^4$ is defined as aforesaid $R^1$,
$R^5$ is defined as aforesaid $R^2$, and
n is an arbitrary number between 2 and 20, for example between 2 and 8, between 9 and 20, such as 5, 6, 8, 10, 15, 20.

The silane oligomer (A) may comprise for example less than 50 wt %, less than 30 wt %, less than 20 wt %, less than 10 wt % of linear oligomer (A2), based on the total weight of silane oligomer (A). Though multi-alkyl functionalized polysiloxane can also be prepared using the silane oligomer (A) having a relatively high amount of linear oligomer, it is not flexible enough to adjust the polymerization degree and viscosity of the polysiloxane since a higher content of alkoxy or hydroxyl groups in the linear oligomer is not conducive to the growth of polysiloxane chains. The silane oligomer (A) suitably comprises more than 5 wt % of linear oligomer (A2), based on the total weight of silane oligomer (A). An appropriate amount of linear oligomer facilitates the introduction of alkoxy or hydroxyl groups to polysiloxane.

Surprisingly, an appropriate content of alkoxy and hydroxyl groups contributes to further lowering the viscosity of the polysiloxane composition with a possible increase in the filler loading by interaction with filler, thereby improving the thermal conductivity of the composition. However, polysiloxanes with a too high content of alkoxy and hydroxyl groups may perform worse in storage stability and are likely to bubble when applied to an addition-curable thermally conductive silicone composition which damages the thermal conductivity.

The silane oligomer (A) may be prepared by hydrolytic condensation of silane, comprising:

i) reacting dialkoxysilane of Formula III with water in the presence of Catalyst 3 and an organic solvent, and the molar ratio of water to dialkoxysilane is greater than 0.5:1, for example greater than 2:1, greater than 3:1, greater than 5:1,

III $$R^6_2R^7R^8Si$$

where $R^6$ is methoxy or ethoxy, $R^7$ is defined as aforesaid $R^1$, $R^8$ is defined as aforesaid $R^2$; and ii) removing by-products, water, Catalyst 3 and organic solvent.

In Step (i), the reaction is preferably carried out at a lower temperature, for example at a temperature below 30° C. such as room temperature or temperature below 10° C. considering that the hydrolysis condensation of the silane is an exothermic reaction. The water is preferably added dropwise to the dialkoxysilane of Formula III considering the reaction is highly exothermic. The reaction is suitably carried out for 1-8 h, for example 3-6 h.

In Step (i), the organic solvent is used to inhibit the reaction rate, which may be for example ethanol or acetonitrile. The amount of the organic solvent is not particularly limited, as long as it ensures the hydrolytic condensation proceeds gently. Catalyst 3 can be an acidic catalyst, for example hydrochloric acid or concentrated sulfuric acid, to promote the hydrolysis and condensation of the dialkoxysilane. In order to further increase the polymerization degree of silane oligomers, alkaline catalysts such as potassium hydroxide can be added for further condensation at the later reaction stage after acidic catalysts are removed.

In Step (i), the molar ratio of water to dialkoxysilane is critical to the composition and structure of the resulting silane oligomer. A lower molar ratio is not conducive to the condensation of dialkoxysilane, or leads to a resultant oligomer having a higher content of alkoxy and hydroxyl groups.

In Step (ii), the by-products, mainly small molecular alcohols, are usually removed by distillation; Catalyst 3 can be removed for example by neutralization with alkaline substances; organic solvents can be removed by rinsing or distillation.

In a preferred embodiment herein, the silane oligomer (A) is prepared by the process comprising steps: i) adding water dropwise to dialkoxysilane of Formula III in the presence of Catalyst 3 such as hydrochloric acid and an organic solvent such as ethanol to carry out reaction, and the molar ratio of water to long-chain alkyl containing dialkoxysilane is greater than 2:1; ii) removing by-products, water, organic solvent and Catalyst 3.

Hydroxyl-Terminated Polysiloxane (B)

The hydroxyl-terminated polysiloxane (B) is typically of Formula IV:

IV

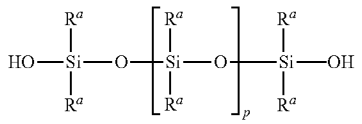

where $R^a$ is independently at each occurrence a C1-C5 alkyl for example methyl, ethyl, propyl, butyl and pentyl, or phenyl, preferably methyl;

p is suitably an arbitrary number between 3 and 150, for example an arbitrary number between 10 and 100 especially an arbitrary number between 10 and 60 such as 15, 20, 25, 30, 35, 40, 45, 50, 55. In an embodiment herein, p is an arbitrary number between 15 and 55 especially between 20 and 50.

Endcapper (C)

The endcapper (C) is typically of Formula V:

V

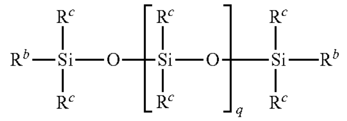

where $R^b$ is methyl, vinyl, hydrogen, aminopropyl, aminoethylaminopropyl or glycidylpropyl, $R^c$ is independently at each occurrence a C1-C5 alkyl, for example methyl, ethyl, propyl, butyl, pentyl, preferably methyl; and q is an arbitrary number between 0 and 20, for example 0, 3, 6, 9, 12, 15, 18.

In an embodiment herein, the endcapper has a structural formula as shown in Formula V, where $R^c$ is methyl and q is 0.

Catalyst 1 and 2 may be an alkaline catalyst, for example alkali metal hydroxides such as potassium hydroxide, quaternary ammonium hydroxides such as tetramethylammonium hydroxide and hydrates thereof; an acidic catalyst for example phosphazene chloride, trifluoromethanesulfonic acid, and acidic ion exchange resin. Catalyst 1 and 2 should be used in a minimum amount required to ensure effective condensation and/or equilibration reaction. Catalyst 1 and 2 may be same or different. In order to avoid the introduction of more catalyst impurities that are more difficult to remove subsequently, Catalyst 2 is preferably the same as Catalyst 1. In this case, to simplify the feeding operation, Catalyst 2 in Step (II) can be fed together with Catalyst 1 in Step (I).

In most cases the alkyl functionalized polysiloxane of the present disclosure can be prepared in the presence of either an alkaline catalyst or an acidic catalyst. Nevertheless the catalyst may vary with the type of endcapper. In an embodiment herein, an endcapper of Formula V where $R^b$ is methyl, vinyl, aminopropyl, aminoethylaminopropyl or glycidylpropyl is used, and Catalyst 1 and 2 are alkaline catalysts. In an another embodiment herein, an endcapper of Formula V where $R^b$ is hydrogen is used, and Catalyst 1 and 2 are acidic catalysts.

In the present disclosure, the amounts of silane oligomer (A), hydroxyl-terminated polysiloxane (B) and endcapper (C) can be selected according to the number of M and D structure units in the desired alkyl functionalized polysiloxane.

In Step (I), the reaction comprises a condensation reaction and an equilibration reaction. Condensation and equilibration reactions often take place simultaneously. The reaction of Step (I) is carried out suitably at a temperature of from 80° C. to 110° C. especially from 90° C. to 105° C. for a period of suitably from 15 min to 4 h. The reaction of Step (I) is advantageously carried out at a reduced pressure to extract small molecular alcohols and water generated therefrom, wherein the pressure is reduced below 100 mbar, for example, below 80 mbar.

In Step (II), the reaction is typically an equilibration reaction, which is carried out suitably at a temperature of from 100° C. to 140° C., especially at a temperature of from 110° C. to 130° C., for a period of suitably from 3 h to 8 h. Generally, the longer the equilibration reaction proceeds, the more uniform the reaction tends to be. However, the above reaction time is preferred for economic consideration In order to adjust the proportion of hydroxyl, alkoxy, etc. end groups in the target alkyl functionalized polysiloxane, a small amount of hydroxyl-terminated polysiloxane (B) can also be added to the equilibrium reaction in step (II).

The preparation method of the present disclosure can further comprise Step (III) of removing the catalysts to minimize the effect of catalyst impurities on product performance. Generally, alkali metal hydroxides are neutralized with acidic catalysts, quaternary ammonium hydroxides are decomposed at a high temperature, acidic catalysts are neutralized with alkaline substances.

The preparation method of the present disclosure can further comprise Step (IV) of removing low boilers, including small molecular cyclosiloxanes, small molecular alcohol, water, etc., preferably by vacuum distillation at a suitable pressure below 100 mbar, for example below 60 mbar, and at a suitable temperature of from 140° C. to 190° C., for example, from 160° C. to 180° C.

In the present disclosure, Step (I), (II) and (III) are advantageously performed in the presence of an inert atmosphere, that is usually a nitrogen or argon atmosphere In the present disclosure, the term "room temperature" refers to 23±2° C.

DETAILED DESCRIPTION OF THE PREFERRED EMBODIMENTS

The present invention is further illustrated by the following examples, but is not limited to the scope thereof. Any experimental methods with no conditions specified in the following examples are selected according to the conventional methods and conditions, or product specifications.

Characterization of Molecular Weight Distribution

PSS SECcurity gel permeation chromatography is used to separate silane hydrolyzed oligomers with different degrees of polymerization, and each molecular weight is determined by comparison with the reference. Tetrahydrofuran is used as the solvent, and PLgel 5 um guard and PLgel 5 um 100 A provided by Agilent are used as the columns. The temperature of the column oven is 45° C., the feed rate is 1 ml/min, and the injection volume is 20 μl.

Characterization of Molecular Structure $^1$H NMR spectroscopy

Test solvent: deuterated chloroform (TMS-free)

Spectrometer: Bruker Avance III HD 400

Sampling head: 5 mm BBO probe

Measured parameters:

$$\text{Pulse sequence } (Pulprog) = zg30$$

$$TD = 65536$$

$$NS = 64$$

$$SW = 18 \text{ ppm}$$

$$AQ = 4.54\ s$$

$$D1 = 5\ s$$

Some measurement parameters may need to be adjusted appropriately depending on the type of spectrometer.

29Si NMR spectroscopy

Test solvent: deuterated benzene (containg relaxation reagent chromium acetylacetonate and no internal standard substance added)

Spectrometer: Bruker Avance III HD 400

Sampling head: 5 mm BBO probe

Measured parameters:

$$\text{Pulse sequence} = zgig60$$

$$TD = 65536$$

$$NS = 2048$$

$$SW = 200 \text{ ppm}$$

$$AQ = 2.04\ s$$

$$D1 = 5\ s$$

Some measurement parameters may need to be adjusted appropriately depending on the type of spectrometer.

Determination of Viscosity of Polysiloxane

The viscosities of polysiloxanes are measured by Brookfield viscometer using a No. 3 spindle at 25° C. and 300 rpm for 30 s.

Determination of Viscosity of the Composition

It is carried out in accordance with DIN EN ISO 3219*: Determination of viscosity of polymers and resins in the liquid state or as emulsions or dispersions using a rotational viscometer with defined shear rate* (*ISO* 3219:1993).

The raw materials used in the Examples are all commercially available, with detailed information as follows:

Hydroxyl-terminated polydimethylsiloxane, WACKER® FINISH WS 62 M, having a dynamic viscosity of 50-110 mPa·s, measured at 25° C. according to DIN 51562, supplied by Wacker Chemicals;

Phosphonitrilic chloride, WACKER® PNCL 2/100 PERCENT, supplied by Wacker Chemicals;

1,1,3,3-tetramethyldisiloxane, supplied by Guike New Material;
Tetramethyldivinyldisiloxane, supplied by TCL;
Alumina A, spherical alumina powder having an average particle size of 40 μm;
Alumina B, spherical alumina powder having an average particle size of 5 μm;
Zinc oxide, non-spherical zinc oxide powder having an average particle size of 5 μm;
Hydrogen-terminated polydimethylsiloxane C1, having a dynamic viscosity of 85 mPa·s at 25° C., supplied by Wacker Chemicals, referred to as H Polymer C1 thereafter;
Hydrogen-terminated polydimethylsiloxane C2, having a dynamic viscosity of 1,040 mPa·s at 25° C., supplied by Wacker Chemicals, referred to as H Polymer C2 thereafter;
Vinyl-terminated polydimethylsiloxane C2, ELASTOSIL® VINYLPOLYMER 120, having a dynamic viscosity of 120 mPa·s, supplied by Wacker Chemicals, referred to as V Polymer C2 thereafter.

Synthesis Example 1

68.5 g of dodecyl diethoxymethylsilane, 110 g of ethanol and 1.22 g of 5% hydrochloric acid aqueous solution were added to a flask at room temperature, stirred, then 25 g of water was added dropwise to the flask to carry out reaction at room temperature for 4 h and then was subject to 65° C. for 1 h to give a white solid precipitate. Afterwards the precipitate was transferred to a distillation flask, which was subjected to rotary evaporation at 85° C. and 100 mbar for 1 h to give oligomers of hydrolyzed dodecyl diethoxymethylsilane. As determined by NMR, the oligomers comprise 53.60 wt % of trimethyltridodecylcyclotrisiloxane $D_3^{C12H25}$, 18.17 wt % of tetramethyltetradodecylcyclotetrasiloxane $D_4^{C12H25}$, 6.83 wt % of $CH_3(OR)(C_{12}H_{25})SiO_{1/2}$ unit (wherein R is $—C_2H_5$ or H, mainly $—C_2H_5$) and 21.40 wt % of $CH_3(C_{12}H_{25})SiO_{2/2}$ unit and cyclic pentamer, cyclic hexamer and cyclic oligomers with higher polymerization degrees. As determined by GPC, the oligomers comprise 52.17 wt % of trimer, 18.75 wt % of tetramer, 6.36 wt % of pentamers and 22.73 wt % of hexamer and oligomers with higher polymerization degrees.

Synthesis Example 2

68.5 g of dodecyl diethoxymethylsilane, 20.87 g of ethanol and 0.14 g of 5% hydrochloric acid aqueous solution were added to a flask at room temperature, stirred, then 4.08 g of water was added dropwise to the flask to carry out reaction at room temperature for 4 h and then was subject to 65° C. for 1 h to give a white solid precipitate. Afterwards the precipitate was neutralized with sodium carbonate and then was transferred to a distillation flask, which was subjected to rotary evaporation at 85° C. and 100 mbar for 1 h to give oligomers of hydrolyzed dodecyl diethoxymethylsilane. As determined by NMR, the oligomers comprise 19.38 wt % of trimethyltridodecylcyclotrisiloxane $D_3^{C12H25}$, 2.76 wt % of tetramethyltetradodecylcyclotetrasiloxane $D_4^{C12H25}$, 65.00 wt % of $CH_3(OR)(C_{12}H_{25})SiO_{1/2}$ unit (wherein R is $—C_2H_5$ or H, mainly $—C_2H_5$) and 11.63 wt % of $CH_3(C_{12}H_{25})SiO_{2/2}$ unit and cyclic pentamer, cyclic hexamer and cyclic oligomers with higher polymerization degrees.

Synthesis Example 3

200 g of hydroxyl-terminated polydimethylsiloxane, 30.8 g of the oligomers of hydrolyzed dodecyl diethoxymethylsilane obtained by Synthesis Example 1 and 0.0592 g of phosphonitrilic chloride were added to a flask, stirred, and heated to 95° C. to carry out reaction at 95° C. and 50 mbar for 0.5 h with nitrogen flow. Then 6 g of 1,1,3,3-tetramethyldisiloxane was added to the flask and heated to 120° C. to react for 5 h. Upon completion of the reaction, sodium carbonate solid was added to treat phosphonitrilic chloride at 50° C. for 1.5 h, and then was filtered. Afterwards the resulting reactant was transferred to a distillation flask, distilled at 170° C. and 30 mbar for 1.5 h to remove low boilers, and cooled to room temperature to give an alkyl functionalized hydrogenpolydimethylsiloxane, referred to as H Polymer 1, of the following structural formula with a dynamic viscosity of 95 mPa·s at 25° C.

$$(H(CH_3)_2SiO)_{1.88}((CH_3)_2SiO)_{60.95}((CH_3)(C_{12}H_{25})SiO)_{3.02}(Si(CH_3)_2(OH))_{0.09}(Si(CH_3)_2(OC_2H_5))_{0.03}$$

Synthesis Example 4

220 g of hydroxyl-terminated polydimethylsiloxane, 7.7 g of the oligomers of hydrolyzed dodecyl diethoxymethylsilane obtained by Synthesis Example 1 and 0.0573 g of phosphonitrilic chloride were added to a flask, stirred, and heated to 95° C. to carry out reaction at 95° C. and 50 mbar for 0.5 h with nitrogen flow. Then 1.5 g of 1,1,3,3-tetramethyldisiloxane was added to the flask and heated to 120° C. to react for 5 h. Upon completion of the reaction, sodium carbonate solid was added to treat phosphonitrilic chloride at 50° C. for 1.5 h, and then was filtered. Afterwards the resulting reactant was transferred to a distillation flask, distilled at 170° C. and 30 mbar for 1.5 h to remove low boilers, and cooled to room temperature to give an alkyl functionalized hydrogenpolydimethylsiloxane, referred to as H Polymer 2, of the following structural formula with a dynamic viscosity of 1,155 mPa·s at 25° C.

$$(H(CH_3)_2SiO)_{1.63}((CH_3)_2SiO)_{241.14}((CH_3)(C_{12}H_{25})SiO)_{3.78}(Si(CH_3)_2(OH))_{0.35}(Si(CH_3)_2(OC_2H_5))_{0.02}$$

Synthesis Example 5

200 g of hydroxyl-terminated polydimethylsiloxane, 41 g of the oligomers of hydrolyzed dodecyl diethoxymethylsilane obtained by Synthesis Example 1 and 0.52 g of 25% tetramethylammonium hydroxide aqueous solution were added to a flask, stirred, and heated to 95° C. to carry out reaction at 95° C. and 40 mbar for 40 min with nitrogen flow. Then 8.35 g of tetramethyldivinyldisiloxane was added to the flask and heated to 120° C. to react for 2 h, afterwards 2.4 g of hydroxyl-terminated polydimethylsiloxane was added and reaction was continued at 120° C. for 2 h. Upon completion of the reaction, the resulting mixture was further heated to 175° C. to decompose the catalyst for 1.5 h. Then the resulting reactant was transferred to a distillation flask, distilled at 175° C. and 30 mbar for 1.5 h to remove low boilers, and cooled to room temperature to give an alkyl functionalized vinylpolydimethylsiloxane, referred to as V Polymer 1, of the following structural formula with a dynamic viscosity of 102 mPa·s at 25° C.

$$((H_2C{=}CH)(CH_3)_2SiO)_{1.70}((CH_3)_2SiO)_{52.33}((CH_3)(C_{12}H_{25})SiO)_{3.81}(Si(CH_3)_2(OH))_{0.07}(Si(CH_3)_2(OC_2H_5))_{0.23}$$

Comparative Synthesis Example 6

632 g of hydroxyl-terminated polydimethylsiloxane, 25.9 g of dodecyl diethoxymethylsilane and 0.51 g of 25% tetramethylammonium hydroxide aqueous solution were added to a flask, stirred, and heated to 95° C. to carry out reaction at 95° C. and 30 mbar for 30 min with nitrogen flow. Then 14.9 g of tetramethyldivinyldisiloxane was added to the flask and heated to 120° C. to react for 2 h, afterwards 11.8 g of hydroxyl-terminated polydimethylsiloxane was added and reaction was continued at 120° C. for 2 h. Upon completion of the reaction, the resulting mixture was further heated to 175° C. to decompose the catalyst for 1.5 h. Then the resulting reactant was transferred to a distillation flask, distilled at 175° C. and 30 mbar for 1.5 h to remove low boilers, and cooled to room temperature to give an alkyl functionalized vinylpolydimethylsiloxane, referred to as V Polymer C1, of the following structural formula with a dynamic viscosity of 110 mPa·s at 25° C.

$$((H_2C{=}CH)(CH_3)_2SiO)_{1.12}((CH_3)_2SiO)_{63.14}((CH_3)(C_{12}H_{25})SiO)_{0.68}(Si(CH_3)_2(OH))_{0.08}(Si(CH_3)_2(OC_2H_5))_{0.80}$$

Synthesis Example 7

170.7 g of hydroxyl-terminated polydimethylsiloxane, 35 g of the oligomers of hydrolyzed dodecyl diethoxymethylsilane obtained by Synthesis Example 2 and 0.12 g of 25% tetramethylammonium hydroxide aqueous solution were added to a flask, stirred, and heated to 95° C. to carry out reaction at 95° C. and 100 mbar for 1 h with nitrogen flow. Then 2.95 g of tetramethyldivinyldisiloxane was added to the flask and heated to 120° C. to react for 3 h. Upon completion of the reaction, the resulting mixture was further heated to 175° C. to decompose the catalyst for 1.5 h. Then the resulting reactant was transferred to a distillation flask, distilled at 175° C. and 30 mbar for 1.5 h to remove low boilers, and cooled to room temperature to give an alkyl functionalized vinylpolydimethylsiloxane, referred to as V Polymer 2, of the following structural formula with a dynamic viscosity of 125 mPa·s at 25° C.

$$((H_2C{=}CH)(CH_3)_2SiO)_{0.28}((CH_3)_2SiO)_{50.26}((CH_3)(C_{12}H_{25})SiO)_{3.60}(Si(CH_3)_2(OH))_{0.05}(Si(CH_3)_2(OC_2H_5))_{1.66}$$

According to table 1, H Polymer 1-2, V Polymer 1 and H Polymer C1-C2, V Polymer C1-C2 were mixed with thermally conductive fillers respectively, and the viscosities of the resulting compositions were measured at shear rates of 1 $s^{-1}$ and 10 $s^{-1}$.

TABLE 1

| Components/g | Composition 1 | Composition C1 | Composition 2 | Composition C2 | Composition 3 | Composition C3 | Composition C4 |
|---|---|---|---|---|---|---|---|
| H Polymer 1 | 10 | / | / | / | / | / | / |
| H Polymer C1 | / | 10 | / | / | / | / | / |
| H Polymer 2 | / | / | 10 | / | / | / | / |
| H Polymer C2 | / | / | / | 10 | / | / | / |
| V Polymer 1 | / | / | / | / | 10 | / | / |
| V Polymer C1 | / | / | / | / | / | 10 | / |
| V Polymer C2 | / | / | / | / | / | / | 10 |
| Alumina A | 25 | 25 | 25 | 25 | 25 | 25 | 25 |
| Alumina B | 36 | 36 | 36 | 36 | 36 | 36 | 36 |
| Zinc oxide | 29 | 29 | 29 | 29 | 29 | 29 | 29 |
| Viscosity of Composition/mPa · s | | | | | | | |
| D = 1 $s^{-1}$ | 819,500 | 963,000 | 2,940,000 | 4,245,000 | 103,450 | 771,000 | 1,660,000 |
| D = 10 $s^{-1}$ | 256,000 | 319,000 | 407,000 | 560,000 | 26,800 | 191,000 | 195,000 |

Table 1 shows that H Polymer 1-2 are more effective in lowering the viscosity of the composition than corresponding H Polymer C1-C2 with similar viscosities at the same thermally conductive filler loading, thereby improving the thermal conductivity of the composition. V Polymer 1 has a very significant advantage in lowering the viscosity of the composition than V Polymer C2 and also performs better compared to V Polymer C1 synthesized by a non-inventive method, which is related to the number of long-chain alkyls introduced.

According to table 2, H Polymer 1-2 and H Polymer C1-C2 were mixed with thermally conductive fillers respectively, and the viscosities of the resulting compositions were measured at shear rates of 1 $s^{-1}$ and 10 $s^{-1}$.

TABLE 2

| Components/g | Composition 5 | Composition C5 | Composition 6 | Composition C6 |
|---|---|---|---|---|
| H Polymer 1 | 10 | / | / | / |
| H Polymer C1 | / | 10 | / | / |
| H Polymer 2 | / | / | 10 | / |
| H Polymer C2 | / | / | / | 10 |
| Alumina A | 60 | 60 | 60 | 60 |
| Alumina B | 30 | 30 | 30 | 30 |
| Viscosity of Composition/mPa · s | | | | |
| D = 1 $s^{-1}$ | 13,300 | 40,200 | 133,500 | 253,000 |
| D = 10 $s^{-1}$ | 11,600 | 23,200 | 126,000 | 183,000 |

Table 2 shows that H Polymer 1-2 are more effective in lowering the viscosity of the composition than corresponding H Polymer C1-C2 with similar viscosities at the same thermally conductive filler loading, thereby improving the thermal conductivity of the composition.

Table 3 lists the viscosity changes of H Polymer 1-2 after being left at room temperature for 10 months. The viscosity changes are within ±5%, showing a good storage stability.

TABLE 3

| | Initial viscosity (mPa · s) | Viscosity after 10 M at room temperature (mPa · s) | Viscosity change |
|---|---|---|---|
| H Polymer 1 | 95 | 95 | 0% |
| H Polymer 2 | 1,155 | 1,190 | +3% |

The invention claimed is:

1. A method of preparing alkyl functionalized polysiloxane, comprising:

I) in a first step, reacting a silane oligomer (A) with a hydroxyl-terminated polysiloxane (B) in the presence of a catalyst 1, wherein the silane oligomer (A) comprises cyclic oligomer(s) (A1) of Formula I:

I

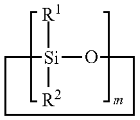

where $R^1$ is independently at each occurrence C6-C18 alkyl, $R^2$ is independently at each occurrence C1-C5 alkyl, m is a number between 3 and 20, wherein the silane oligomer (A) comprises more than 30 wt % of cyclic trimer and tetramer of Formula I, based on the total weight of the silane oligomer (A), the hydroxyl-terminated polysiloxane (B) is of Formula IV:

IV

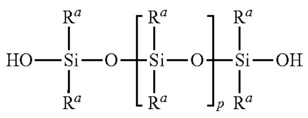

where $R^a$ is independently at each occurrence C1-C5 alkyl or phenyl, and p is a number between 3 and 150, and II) in a second step following the first step, reacting the product of step (I) with an endcapper in the presence of a catalyst 2 to give the alkyl functionalized polysiloxane, wherein catalyst 1 and catalyst 2 may be the same or different, wherein each R' independently is selected from the group consisting of decyl, dodecyl, tetradecyl, hexadecyl, and mixtures thereof.

2. The method of claim 1, wherein the silane oligomer (A) comprises more than 30 wt % of cyclic trimer of Formula I, based on the total weight of silane oligomer (A).

3. The method of claim 1, wherein the silane oligomer (A) further comprises a linear oligomer (A2) of Formula II:

II

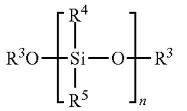

where $R^3$ is methyl, ethyl or hydrogen, $R^4$ is independently at each occurrence C6-C18 alkyl, $R^5$ is independently at each occurrence C1-C5 alkyl, and n is a number between 2 and 20.

4. The method of claim 3, wherein the hydroxyl-terminated polysiloxane (B) is of Formula IV:

IV

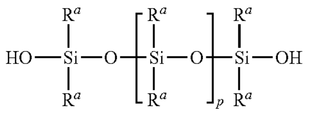

where $R^a$ is independently at each occurrence a C1-C5 alkyl or phenyl, and p is a number between 10 and 100.

5. The method of claim 1, wherein the endcapper (C) is of Formula V:

V

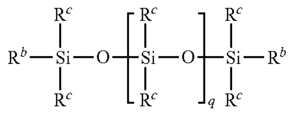

where $R^b$ is methyl, vinyl, hydrogen, aminopropyl, aminoethylaminopropyl or glycidylpropyl, $R_c$ is independently at each occurrence C1-C5 alkyl, and q is a number between 0 and 20.

6. The method of claim 1, wherein step I is conducted at a reduced pressure which facilitates removal of water.

7. The method of claim 1, wherein the reaction of Step (I) is carried out at a temperature of from 80° C. to 110° C.

8. The method of claim 1, wherein the reaction of Step (II) is carried out at a temperature of from 100° C. to 140° C.

9. The method of claim 1, wherein the silane oligomer (A) is prepared by a process comprising:

i) reacting a dialkoxysilane of Formula III:

V

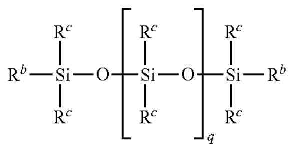

with water in the presence of a condensation catalyst and an organic solvent, wherein the molar ratio of water to dialkoxysilane is greater than 0.5:1, where $R^6$ is methoxy or ethoxy, $R^7$ is C6-C18 alkyl, $R^8$ is C1-C5 alkyl; and ii) removing by-products, water, condensation catalyst and organic solvent.

10. The method of claim 9, wherein the molar ratio of water to dialkoxysilane is greater than 2:1.

11. The method of claim 9, wherein the condensation catalyst is an acidic catalyst.

12. The method of claim 9, wherein the organic solvent is ethanol or acetonitrile.

13. A method of preparing alkyl functionalized polysiloxane, comprising:

I) in a first step, reacting a silane oligomer (A) with a hydroxyl-terminated polysiloxane (B) in the presence of a catalyst 1, wherein the silane oligomer (A) comprises cyclic oligomer(s) (A1) of Formula I:

I

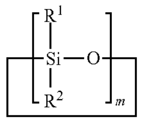

where $R^1$ is independently at each occurrence C6-C18 alkyl, $R^2$ is independently at each occurrence C1-C5 alkyl, m is a number between 3 and 20, wherein the silane oligomer (A) comprises more than 30 wt % of cyclic trimer and tetramer of Formula I, based on the total weight of the silane oligomer (A), the hydroxyl-terminated polysiloxane (B) is of Formula IV:

IV

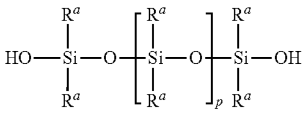

where $R^a$ is independently at each occurrence C1-C5 alkyl or phenyl, and p is a number between 3 and 150, and II) in a second step following the first step, reacting the product of step (I) with an endcapper in the presence of a catalyst 2 to give the alkyl functionalized polysiloxane, wherein catalyst 1 and catalyst 2 may be the same or different, and wherein step I is conducted in an inert atmosphere at a reduced pressure, wherein the reduced pressure is a pressure below 100 mbar.

14. The method of claim 13, wherein the inert atmosphere comprises nitrogen, argon, or a mixture thereof.

15. The method of claim 13, wherein the endcapper (C) comprises a disiloxane of the formula:

V

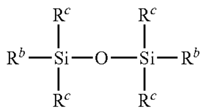

wherein $R^b$ is vinyl, hydrogen, aminopropyl, aminoethylaminopropyl, or glycidylpropyl, and $R^c$ is independently at each occurrence a C1-C5 alkyl.

16. The method of claim 13, wherein the endcapper (C) is a disiloxane of the formula

V

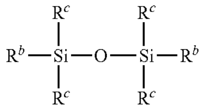

wherein $R^c$ are independently C1-C5 alkyl and $R^b$ is H.

17. A method of preparing alkyl functionalized polysiloxane, comprising:

I) in a first step, reacting a silane oligomer (A) with a hydroxyl-terminated polysiloxane (B) in the presence of a catalyst 1, wherein the silane oligomer (A) comprises cyclic oligomer(s) (A1) of Formula I:

I

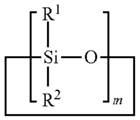

where $R^1$ is independently at each occurrence C6-C18 alkyl, $R^2$ is independently at each occurrence C1-C5 alkyl, m is a number between 3 and 20, wherein the silane oligomer (A) comprises more than 30 wt % of cyclic trimer and tetramer of Formula I, based on the total weight of the silane oligomer (A), the hydroxyl-terminated polysiloxane (B) is of Formula IV:

IV

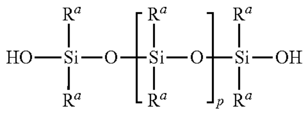

where $R^a$ is independently at each occurrence C1-C5 alkyl or phenyl, and p is a number between 3 and 150, and II) in a second step following the first step, reacting the product of step (I) with an endcapper in the presence of a catalyst 2 to give the alkyl functionalized polysiloxane, wherein catalyst 1 and catalyst 2 may be the same or different, and wherein step I is conducted in an inert atmosphere at a reduced pressure, wherein each $R^1$ independently is selected from the group consisting of decyl, dodecyl, tetradecyl, hexadecyl, and mixtures thereof.

* * * * *